(12) United States Patent
Jagiella et al.

(10) Patent No.: US 7,123,003 B2
(45) Date of Patent: Oct. 17, 2006

(54) SENSOR ASSEMBLY AND FUNCTIONAL UNIT FOR DETECTING THE POSITION OF A MOVEABLE MAGNET

(75) Inventors: Manfred Jagiella, Notzingen (DE); Hans-Jürgen Sauerzapf, Lichtenwald (DE)

(73) Assignee: BALLUFF GmbH, Neuhausen (DE)

( * ) Notice: Subject to any disclaimer, the term of this patent is extended or adjusted under 35 U.S.C. 154(b) by 0 days.

(21) Appl. No.: 10/316,959

(22) Filed: Dec. 10, 2002

(65) Prior Publication Data

US 2003/0112005 A1 Jun. 19, 2003

(30) Foreign Application Priority Data

Dec. 11, 2001 (DE) ................. 101 61 541

(51) Int. Cl.
*G01B 7/14* (2006.01)
*G01B 7/30* (2006.01)

(52) U.S. Cl. .............................. 324/207.13; 324/207.24

(58) Field of Classification Search .............................. 324/207.11–207.13, 207.2, 207.21, 207.22, 324/207.24–207.26, 173–176, 33, 307.24; 338/32 R, 32 H
See application file for complete search history.

(56) References Cited

U.S. PATENT DOCUMENTS

| 5,201,838 | A | | 4/1993 | Roudaut |
| 5,231,352 | A | | 7/1993 | Huber |
| 5,742,161 | A | * | 4/1998 | Karte .................... 324/207.16 |
| 5,955,881 | A | * | 9/1999 | White et al. ............. 324/207.2 |
| 6,016,055 | A | * | 1/2000 | Jager et al. ................. 324/165 |
| 6,331,772 | B1 | * | 12/2001 | Windte et al. ......... 324/207.24 |
| 6,552,532 | B1 | * | 4/2003 | Sako ....................... 324/207.2 |

| 2002/0014128 | A1 | 2/2002 | Kroll et al. |

FOREIGN PATENT DOCUMENTS

| DE | 40 27 200 | 1/1991 |
| DE | 44 29 857 | 2/1996 |
| DE | 694 09 807 | 4/1998 |
| DE | 200 03 631 | 9/2000 |
| DE | 100 38 001 | 2/2002 |

(Continued)

OTHER PUBLICATIONS

*Patent Abstracts of Japan*, Abstract of Japanese Patent "Detecting Device of Position of Piston of Hydropneumatic Cylinder", Publication No. 01031002, Date of Publication—Feb. 1, 1989, Japanese Application No. 62188286, Filed Jul. 28, 1987.

(Continued)

*Primary Examiner*—Reena Aurora
(74) *Attorney, Agent, or Firm*—Lipsitz & McAllister LLC (57) ABSTRACT

In order to improve a sensor assembly for detecting the position of a magnet which is movable in relation to the sensor assembly, with a sensor housing, in which a sensor element sensitive to magnetic fields is arranged, it being possible to generate a digital output signal, the switching state of which is dependent on the relative position between the sensor element and the magnet, in such a way that it has an extended range of uses, the sensor element is provided with at least one field directing device of a magnetizable material which is arranged with respect to the sensor element, and varies in its geometrical dimensions transversely in relation to a direction of relative movement between the magnet and the sensor element, in such a way that an amplified analog sensor signal which characterizes the relative position between the sensor element and the magnet can be generated, at least in a specific relative positional range.

26 Claims, 5 Drawing Sheets

FOREIGN PATENT DOCUMENTS

| | | |
|---|---|---|
| EP | 0 457 762 | 11/1991 |
| EP | 0 707 195 | 4/1998 |
| GB | 2 199 145 | 6/1988 |
| JP | 20065511 | * 3/2000 |

OTHER PUBLICATIONS

BALLUFF GmbH information sheet, "Schnell und einfach montiert", No. 816162 D, Edition 9905.

* cited by examiner

SENSOR ASSEMBLY AND FUNCTIONAL UNIT FOR DETECTING THE POSITION OF A MOVEABLE MAGNET

The present disclosure relates to the subject matter disclosed in German application No. 101 61 541.8 of Dec. 11, 2001, which is incorporated herein by reference in its entirety and for all purposes.

BACKGROUND OF THE INVENTION

The invention relates to a sensor assembly for detecting the position of a magnet which is movable in relation to the sensor assembly, with a sensor housing, in which a sensor element sensitive to magnetic fields is arranged, it being possible to generate a digital output signal, the switching state of which is dependent on the relative position between the sensor element and the magnet.

Sensor assemblies of this type are used, for example, to detect the position of a piston ring of a pneumatic cylinder through the nonmagnetic cylinder wall. When the piston approaches the sensor element, the output jumps into another switching state, that is to say the digital switching state indicates whether or not the piston has approached the sensor element.

SUMMARY OF THE INVENTION

The sensor assembly of the present invention has an extended range of uses. In accordance with the present invention, a sensor element is provided with at least one field directing device or field guiding device of a magnetizable material which is arranged with respect to the sensor element, and is varied in its geometrical dimensions transversely in relation to a direction of relative movement between the magnet and the sensor element, in such a way that an intensified analog sensor signal which characterizes the relative position between the sensor element and the magnet can be generated, at least in a specific relative positional range.

It has been found that if, for example, instead of a rectangular Mu-metal platelet, a directing device with varying transverse dimensions is used as the directing device, an intensified and, in particular, amplified signal is obtained, at least in a specific distance range. The field directing device directs (routes) field lines and directs them towards the sensor element. By appropriate shaping device geometrically, this routing and guiding can be optimized in order to expose the sensor element to a field in an optimized way. Since, for example in the case of a Hall-effect sensor element, the output voltage is directly proportional to the intensity of the magnetic induction at its location, an intensified output signal can be obtained by optimizing the geometrical shape. It has been found in this respect that just such an optimized output signal is obtained if the dimensions of the field directing device vary transversely in relation to the direction of relative movement, that is to say are not constant.

A characteristic of the sensor assembly that is optimized for the respective use can then be adjusted, the optimization taking place in terms of the waveform and/or signal distance (magnitude).

Since an intensified, amplified analog signal can be obtained by such a field directing device, it is possible to obtain in addition to the position detection with respect to a relative position between the sensor assembly and the magnet also further analog information, which can be advantageously put to use. For example, even before reaching an end position to be detected, an approach by the magnet can be detected, which can be used for example to slow down (brake) the moving part with the magnet, to prevent hard impact.

The fact that the sensor signal can be specifically adjusted by the field directing device of varying geometrical shape, and in particular is intensified (amplified), means that the signal-to-noise ratio is also improved, in order in this way to provide an optimized output signal.

By adapting the geometrical shape to the specific use, an optimized output signal which is adapted to the requirements of the use can thus be generated.

The variations in the geometrical shape of the field directing device can be produced in a simple way by, for example, appropriately cutting to size a corresponding foil of a magnetizable material and then arranging this foil on or in the sensor housing. This allows a basic type of sensor assembly which is sensitive to magnetic fields to be provided in a simple and low-cost way with a large number of additional functions, adapted to specific uses, or additional evaluation possibilities for corresponding signals.

In particular, the field directing device varies in its length along the direction of relative movement if, for example, a height varies in the transverse direction thereto.

To achieve optimum exposure of the sensor element to a field, the field directing device is advantageously produced from a material with a high saturation field strength and steep hysteresis; the material of the field directing device also has a high permeability.

For example, the field directing device is produced from an Mu-metal.

It is most particularly advantageous if the field directing device is of one-piece shape. As a result, it can be manufactured and integrated into the sensor assembly in a simple way. It has been found in this respect that good results can also be achieved with a one-piece field directing device.

It is advantageous if a transverse height of the field directing device is less transversely in relation to the direction of relative movement at an end at a distance from the sensor element than at an end toward the sensor element. Since field lines of the magnet have to impinge perpendicularly on surfaces of the field directing device, an optimized field routing and directing within the field directing device onto the sensor element can be achieved thereby, in order in this way to obtain an optimized analog output signal for the specific use.

It has also proven to be advantageous if a transverse height of the field directing device varies monotonically transversely in relation to the direction of relative movement between the sensor element and the magnet, at least in a subregion. In particular, the monotonic variation and, above all, the increase in the direction of the sensor element takes place in such a way that it is only in a very small subregion that there is no monotonic increase but, if at all, a constancy of the height.

Advantageously, a transverse height of the field directing device is decreasing, at least in a subregion, with respect to a direction away from the sensor element toward the magnet, if the field directing device is between the sensor element and the magnet. This allows an optimized field routing and directing toward the sensor element to be achieved.

Corresponding geometrical configuration of the field directing device allows the effect to be achieved that a substantially linear output signal is obtained, at least in a specific relative positional range.

In particular, a delimiting line which defines the height of the field directing device transversely in relation to the direction of relative movement is then predetermined, in order in this way to obtain a linear analog output signal.

It may be provided that a transverse height of the field directing device increases substantially linearly toward the sensor element. In particular, the field directing device is then of a triangular form. Such a field directing device can be produced in a simple way.

However, it may also be provided that a transverse height of the field directing device decreases in the region of its end toward the sensor element to a greater degree, away from said end, than in the region of its end remote from the sensor element, toward said end. For example, a corresponding delimiting line of the field directing device may have an at least approximately exponential progression. A signal amplification with respect to the distance signal has also been obtained in the case of such a configuration of the field directing device, at least in a specific relative positional range.

The field directing device is advantageously made flat, for example in the form of a sheet or foil. Consequently, the geometrical shape of the field directing device can be manufactured in a simple way, for example by punching or cutting to size and also the field directing device can be arranged on or in the sensor housing in a simple way.

Furthermore, it is advantageous if the field directing device is arranged in such a way that it is oriented in a longitudinal direction substantially parallel to the direction of relative movement between the sensor element and the magnet. Optimum exposure of the sensor element to a field can also be ensured in this way.

In particular, the longitudinal direction of the field directing device is then determined by its longer side.

Furthermore, it is advantageous if the field directing device is arranged in such a way that it does not cover the sensor element. It has been found that exposure to a field to obtain an amplified analog output signal is ensured in this way.

To avoid damage to and soiling of the field directing device, it is advantageously arranged in the sensor housing.

It may also be provided that there is at least one further sensor element, which, for carrying out measurements at spatial locations at a distance, is arranged at a distance from the other sensor element. Fields can then be measured at two different locations, to minimize in this way for example the influence of homogeneous fields.

It is most particularly advantageous if the analog output signal can be tapped, so that it can be put to use.

It may be provided that, for fixing on a functional unit such as a pneumatic cylinder, a sensor holder is provided, which can be brought into a position following the sensor housing in the longitudinal direction and, in this position, can be releasably connected to the sensor housing by means of positively engaging elements. Such a sensor assembly is described in the German patent application not published before the priority date, No. 100 38 001.8 of Aug. 4, 2000 (with parallel U.S. application Ser. No. 09/920,518, now U.S. Pat. No. 6,637,279), to which reference is expressly made hereby.

Furthermore, the invention relates to a functional unit which comprises a housing and a part which is movable in the housing and the position of which is to be detected, the movable part being connected to a magnet.

This part may be, for example, a pneumatic cylinder, the piston position of which is to be ascertained.

Such a functional unit is in accordance with the present invention improved in such a way that additional positional information can be obtained by providing a sensor assembly according to the invention being arranged on the housing in order to sense the position of the movable part without contact.

The advantages of such a functional unit have already been described in connection with the sensor assembly according to the invention.

Further advantageous configurations have likewise already been described in connection with the sensor assembly according to the invention.

In particular, the sensor assembly supplies a digital position signal when the movable part reaches a specific relative position with respect to the sensor element. This allows a jump from one switching state into another switching state to be triggered when the movable part approaches, in order to indicate that this specific position has been reached.

It is most particularly advantageous if, at least in a specific relative positional range, the sensor assembly supplies an analog position signal from which it is then correspondingly possible to obtain additional information, which can be used for example for controlling the movement of a movable part.

For example, it may be provided that the analog position signal is used to approach one or more positions, that is to say not only is a relative position detected, but the analog sensor signal is also used for controlling movement to a specific relative position.

It may be provided that the analog signal is used to slow down or brake the movable part, in order in this way for example to avoid hard impact at the end positions.

It may also be provided that the analog position signal is used to monitor a specific position of the movable part, in order in this way for example also to be able to detect relatively small displacements from this position.

The magnet is, for example, a magnet which has an axial magnetization, such as a ring magnet.

The field directing device is advantageously arranged with a longitudinal side aligned with the direction of magnetization on the magnet, in order in this way to achieve optimum exposure of the sensor element to a field.

The following description of preferred exemplary embodiments serves together with the drawing for a more detailed explanation of the invention.

DETAILED DESCRIPTION OF THE INVENTION

Figure 1:
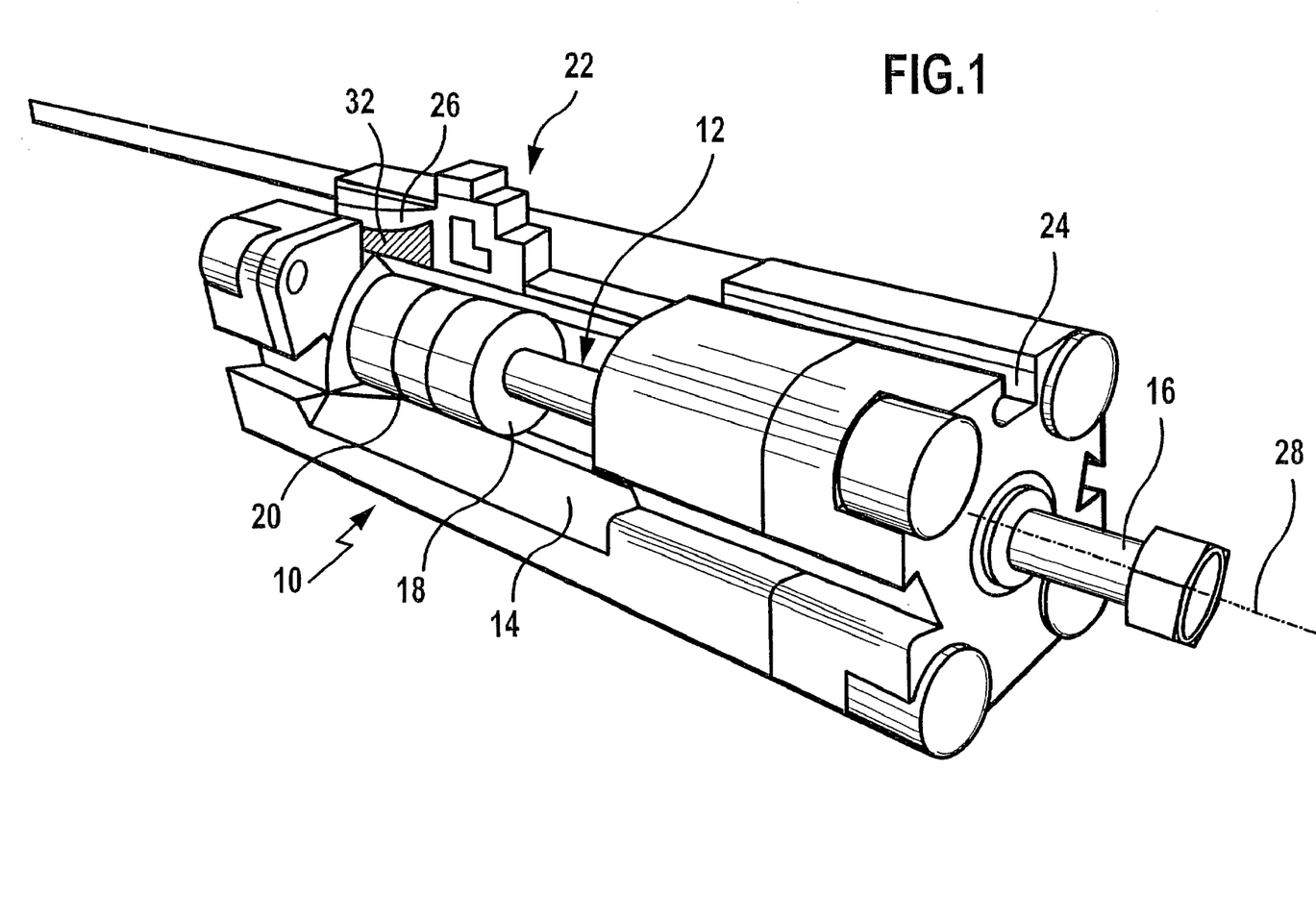
FIG. 1 shows an exemplary embodiment of a pneumatic cylinder as a functional unit which is provided with a sensor assembly, in a perspective, partly cut-open representation.

In the case of a pneumatic cylinder as the exemplary embodiment of a functional unit, which is shown in FIG. 1 and is designated as a whole by 10, a piston 12 is displaceably mounted in a cylinder housing 14. The functional unit is defined as an object with regard to which via a sensor assembly one or several states of the object are to be determined. In particular, a state to be sensed is a positional state.

This piston 12 comprises a piston spindle 16 and a piston ring 18, the translational movement of the piston ring 18 being actuated by means of the spindle 16.

An axially magnetized magnet 20, and in particular a ring magnet, is arranged in a translationally fixed manner on the piston ring 18. By means of this magnet 20, the position of the piston 12 in the housing 14 can be detected from an outer region outside the housing 14 without contact and without undergoing any wear by a sensor which is sensitive to magnetic fields.

For example, the housing 14 of the pneumatic cylinder 10 has a slot 24 or a plurality of such slots and a sensor holder is provided (not shown in FIG. 1), which can be brought into a position following the sensor housing 26 in the longitudinal direction and, in this position, can be releasably connected to the sensor housing 26 by means of positively engaging elements, with the result that the sensor housing 26 can be fixed to the pneumatic cylinder 10 by means of the sensor holder.

Such a sensor assembly is described in the German patent application not published before the priority date, No. 100 38 001.8 of Aug. 4, 2000 (corresponding to pending U.S. application Ser. No. 09/920,518, now U.S. Pat. No. 6,637, 279) to which reference is expressly made hereby.

Adaptation of the sensor housing represents a simple possible way of adapting the sensor assembly to different functional units and, since the sensor holder is arranged in such a way as to follow the sensor housing 26 in the longitudinal direction, of adapting the sensor assembly to a wide variety of installation possibilities and, in particular, of accommodating it in slots or other elongate recesses of a functional unit such as the pneumatic cylinder 10.

The piston 12 of the pneumatic cylinder 10 is movable back and forth in a direction 28. The sensor assembly 22 is capable of generating a digital signal which changes the switching state when the piston ring 18 reaches a specific relative position with respect to the sensor assembly 22. Once this specific position has been reached, the switching state changes, or if the piston ring 18 moves away from this specific position, the switching state of the digital output signal of the sensor assembly 22 once again changes. Arranging the sensor assembly 22 on the housing 14 of the pneumatic cylinder 10 has the effect that a switching point is generated, the respective switching state indicating when a specific position is reached by the piston ring 18.

Figure 2:
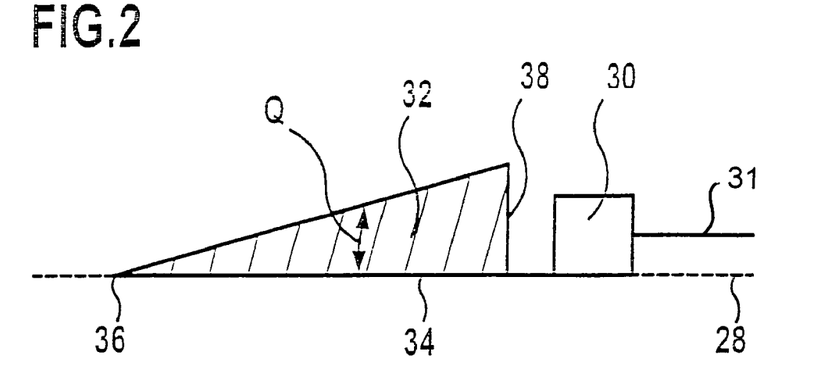
FIG. 2 shows a first exemplary embodiment of a field directing device with a sensor element.
Figure 3:
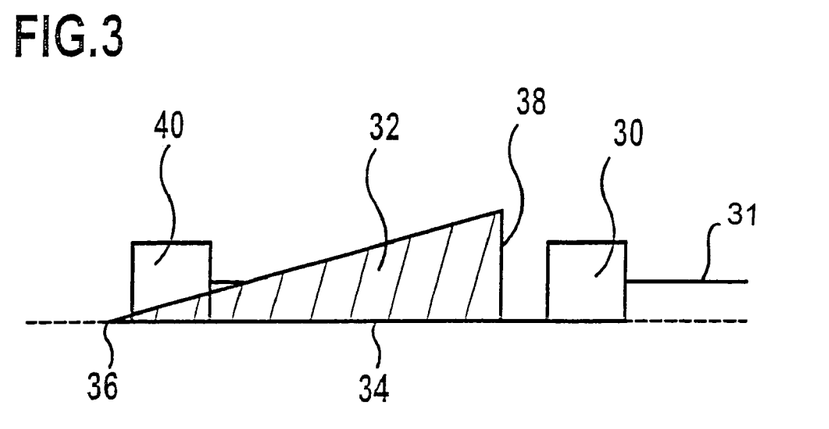
FIG. 3 shows a second exemplary embodiment of a field directing device with two sensor elements.
Figure 4:
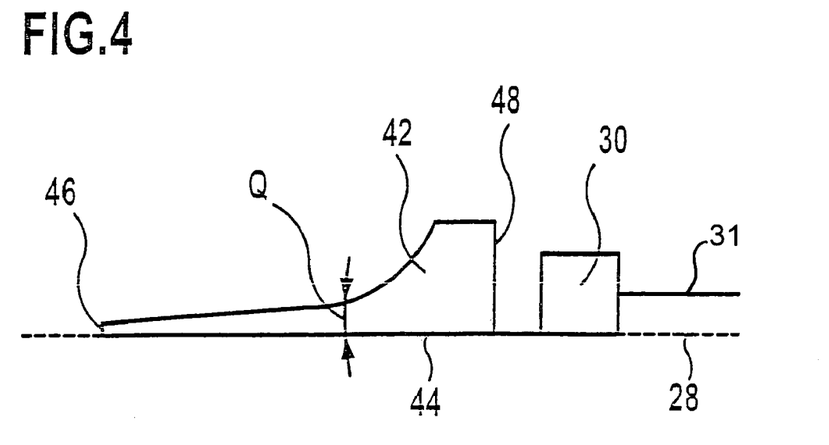
FIG. 4 shows a third exemplary embodiment of a field directing device with a sensor element.

In order to generate the corresponding signal, the sensor assembly 22 comprises a sensor element 30 arranged in the sensor housing 26 (FIGS. 2 to 4). This sensor element is, for example, a Hall-effect sensor element or a permalloy sensor element (AMR or GMR sensor element), which converts a specific field impact into a voltage dependent on it, which can then be emitted as an output signal 31. Furthermore, corresponding evaluation electronics are also arranged in the sensor housing 26 in order to generate just such a suitable output signal 31.

According to the invention, it is consequently provided that arranged in front of the sensor arrangement 30 is a field directing device 32, which provides optimized exposure of the sensor element 30 to a field, i.e. optimized field impact of the sensor element 30, in order in this way to optimize the output signal, which depends on the relative distance between the sensor element 30, the sensor assembly 22 and the magnet 20.

The field directing device is manufactured from a magnetizable material, which has in particular a high saturation field strength and a steep hysteresis (high permeability); for example, an Mu-metal or other metal-glass materials are used. The field directing device 32 is of a one-piece form and in this respect is made in particular in the form of a platelet, with an underside and an upper side, between which there is the same distance over substantially the entire range of its surface area. For example, the field directing device 32 is made in the form of a foil.

The field directing device 32 is arranged within the sensor housing 26, its geometrical dimensions varying in a transverse direction in relation to the direction of relative movement 28 between the magnet 20 and the sensor element 30.

In the case of the first exemplary embodiment, shown in FIG. 2, the field directing device 32 is of a triangular form, with a longer side 34 which is oriented parallel to the direction of relative movement 28. Transversely in relation to this direction of relative movement 28, a transverse height Q of the field directing device 32 is dependent on the distance from the sensor element 30. At an end 36 at a distance from the sensor element 30, the height is at a minimum, while at an end 38 toward the sensor element 30 it is at a maximum. Between these two ends 36 and 38, the transverse height increases linearly, becoming zero at the end 36.

The end 38 is in this case arranged at a distance from the sensor element 30, with the result that the latter is not covered by the field directing device 32.

With respect to the direction 28, the length of the field directing device 32 also varies according to the distance from the longer side 34.

In the case of the second exemplary embodiment according to FIG. 3, the field directing device 32 is arranged in the same way with respect to the sensor element and is formed in the same way as described above on the basis of the first exemplary embodiment. However, a further sensor element 40 is provided, which is arranged away from the sensor element 30, for example in the region of the end 36 of the field directing device 32 at a distance from the sensor element 30. In this case, an overlap may or may not be provided between the sensor element 40 and the field directing device 32.

The fact that two sensor elements 30 and 40 are provided allows, for example, differential measurements to be carried out, in order in this way for example to minimize disturbing effects. Other mathematical operations, such as convolutions, can also be carried out with the sensor signals.

In the case of a third exemplary embodiment, which is shown in FIG. 4, a field directing device 42 is provided, which is configured, for example, in the form of a foil and has a longer side 44 which is aligned parallel to the direction of relative movement 28 and has a smaller transverse height Q at one end 46, remote from the sensor element 30, than at the other end 48, toward the sensor element 30.

Here, too, the transverse height Q increases monotonically, from one end 46 to the other end 48, at least in a subregion, and remains constant, if at all, in a region close to the end 48. At the end 46, the transverse height Q is finite.

The increase in height is slower to start with from the end 46 than it is in a region which is closer to the end 48; there, the corresponding outer delimiting line of the field directing device 42 is consequently steeper. It may be provided, for example, that this outer delimiting line follows an exponential progression.

The magnetic field lines are routed and directed specifically onto the sensor element 30 by the field directing device 32 or 42, in order in this way to optimize the measuring signal, which contains the positional information.

Figure 5:
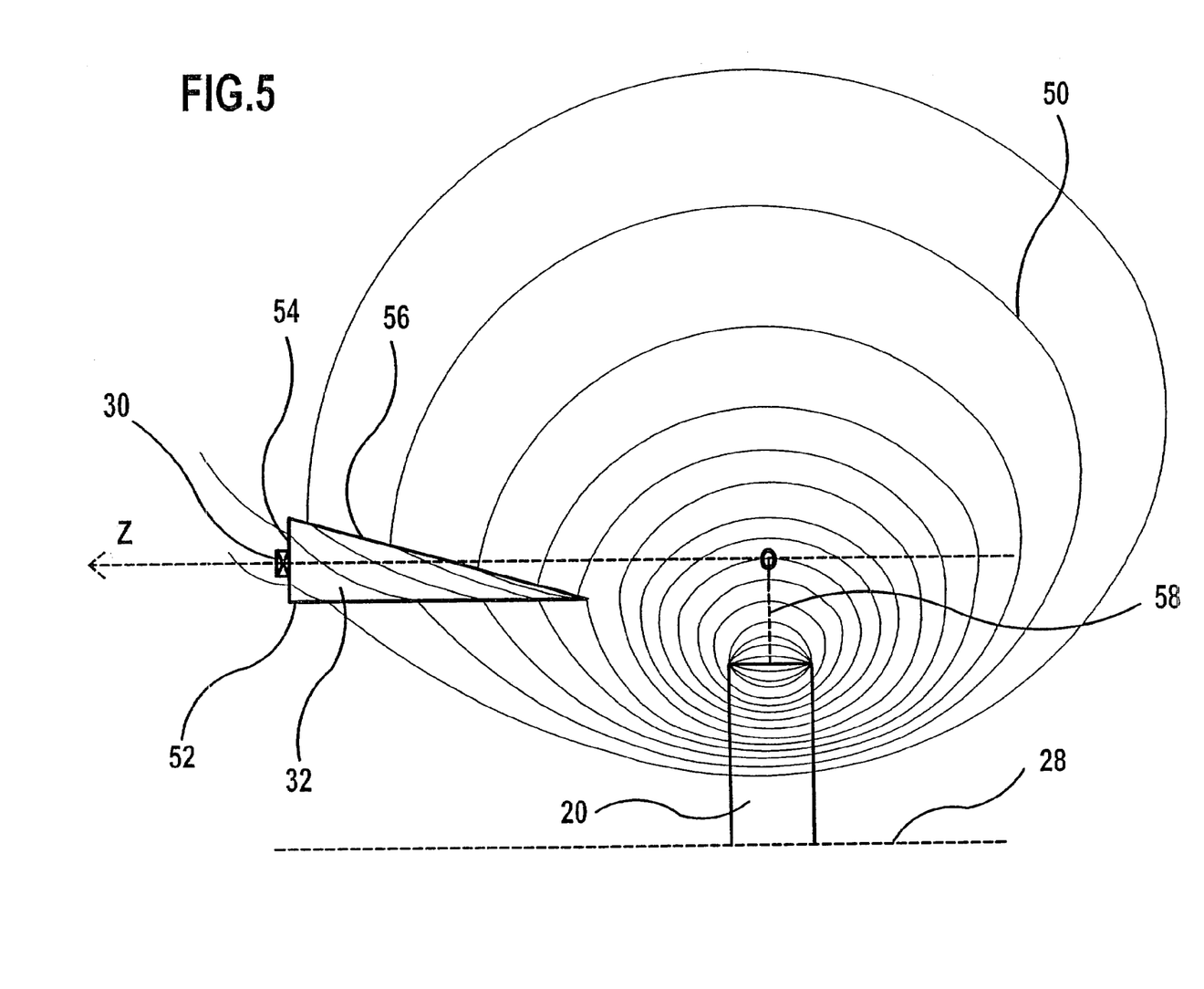
FIG. 5 schematically shows the field pattern in the case of a ring magnet and in the case of a field directing device according to FIG. 2.
Figure 6:
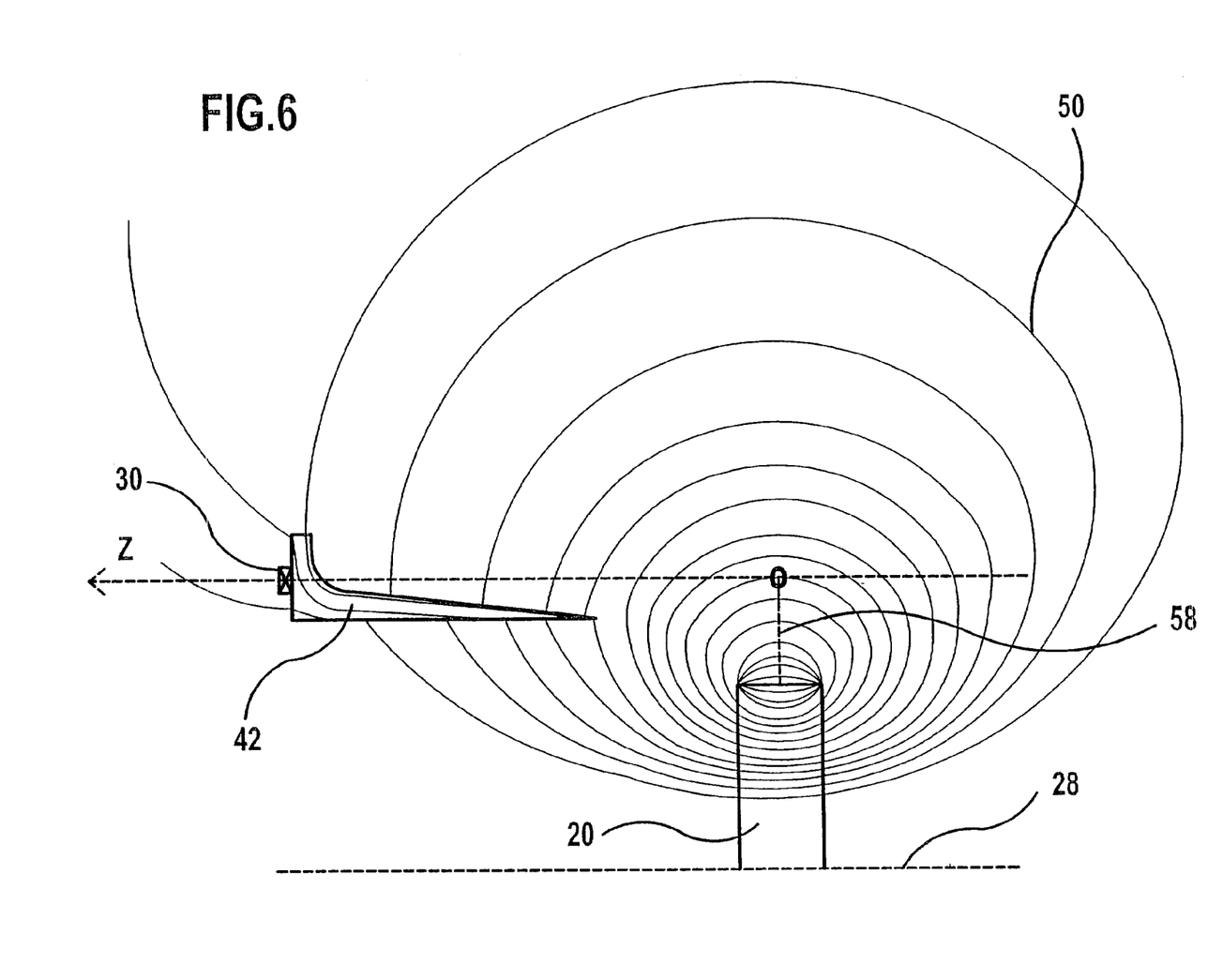
FIG. 6 shows the field pattern as in FIG. 5, but with the field directing device according to FIG. 4 provided.

In FIGS. 5 and 6, field patterns for the assemblies according to FIGS. 2 and 4 are respectively shown:

The ring magnet 20 is axially magnetized and generates a corresponding magnetic field, the field lines of which are shown, respectively designated by 50 in FIGS. 5 and 6. The field directing device 32 influences this field pattern in the vicinity of the sensor element 30 and consequently controls its exposure to the field, i.e. its field impact: the field lines 50 must impinge perpendicularly on the corresponding surfaces 52, 54 and 56 of the field directing device 32 in FIG. 5 (areas of the triangle). The field pattern within the field directing device 32 is then also determined by this boundary condition. As a result, the geometrical shape of the field directing device 32 determines the exposure of the sensor element 30 to the field, as can be seen for example from the comparison of FIGS. 5 and 6.

In the case of the field directing device 42 of FIG. 6, the field lines 50 must likewise impinge perpendicularly on its surfaces, with the result that here, too, the exposure of the sensor element 30 to the field is determined.

Figure 7:
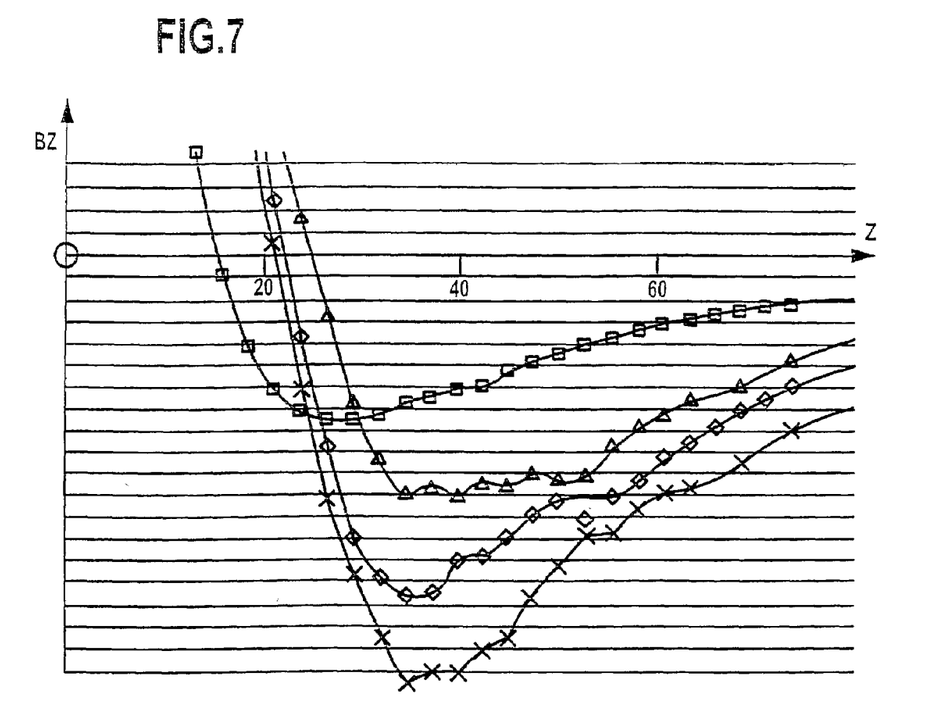
FIG. 7 shows the magnitude of the field component $B_z$ with respect to a relative distance between a sensor element and a magnet when the field directing device is arranged and geometrically shaped in the way shown in FIGS. 5 and 6.

In FIG. 7, the field $B_z$ in the direction of relative movement 28 between the sensor element 30 and the magnet 20 is shown. A transverse distance between the magnet 20 and the longer side 34 or 44 of the field directing device 32 or 42 does not vary in this case and the zero point is defined as that position in which the sensor element 30 is opposite the magnet 20 (indicated in FIGS. 5 and 6 by the line 58).

Simulation results for the field directing device 32 (closed lozenges), the field directing device 42 (crosses) and a rectangular field directing device (open triangles) are shown. For comparison, the pattern of the field $B_z$ when there is no field directing device at all (closed squares) is also shown.

As can be clearly seen from these simulation results, the field $B_z$ to which the sensor element 30 is exposed can be specifically directed by an appropriate geometrical configuration of the field directing device and, in particular, the field exposure can be increased in size, and consequently the range of uses of the sensor assembly 22 can be increased. For example, in the positional range z=30 (in the case of the simulation taken as a basis, the unit is mm), with the field directing device 32 the field is increased by about 40% in comparison with the case when the geometrical shape of the field directing device is not varied (rectangular field directing device). If the field directing device 42 is used, the increase in this range is even about 70%. The sensitivity is consequently increased.

According to the invention, a signal which can be better evaluated is consequently obtained by the field directing devices 32, 42, the increase being at least 10% generally with respect to the case without varying geometrical shape in a transverse direction. Since, for example in the case of a Hall-effect sensor, the generated voltage is directly proportional to the magnetic field to which it is exposed, this intensification directly means an improvement in the evaluable signal.

As a result, the signal-to-noise ratio is increased, with the result that the corresponding signal can be evaluated better.

In addition, as can be seen from the curves according to FIG. 7, the zero point of the field pattern is displaced toward smaller distances if the field directing devices 32 and 42 are used, with the result that the measuring range is also increased, or can be specifically adjusted by appropriate configuration of the geometry of the field directing device.

By increasing the transverse height Q of the field directing device 32 or 42 toward the sensor element 30, and in particular by a monotonic increase at least up to close to the end 38 or 48, the magnetic field is optimally directed onto the sensor element 30, in order in this way to optimize the output signal correspondingly.

Since the output signal is optimized, it contains distance-related information, that is to say an analog output signal can be tapped and used to derive analog distance-related information, at least in a relative positional range.

Accordingly, an analog signal can also be obtained by means of the sensor assembly 22, to be precise in addition to the digital signal which indicates when a specific position is reached by the magnet 20 in relation to the sensor element 30.

Figure 8:
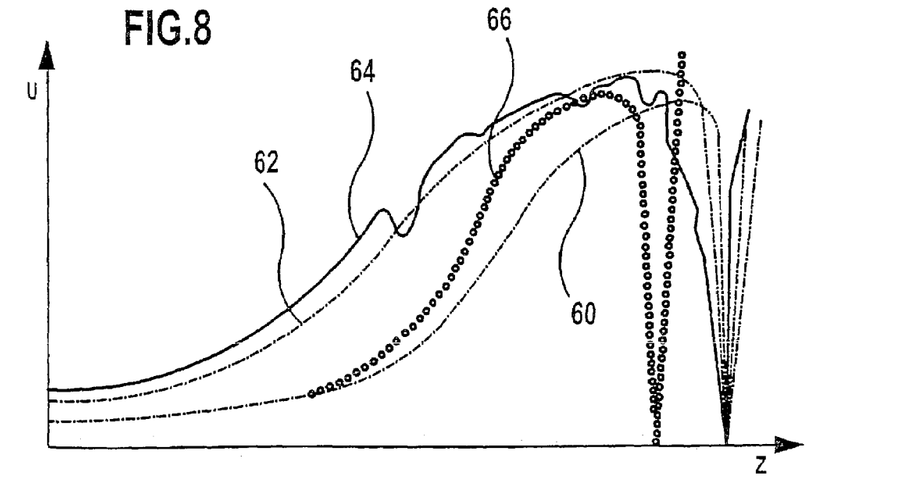
FIG. 8 shows measurement results of an output voltage of the sensor assembly plotted against the relative position between the sensor element and the magnet in the case of different configurations of the field directing devices and different ways of arranging the sensor element.

Shown by way of example in FIG. 8 are measured waveforms for the output voltage of the sensor assembly 22 with respect to the relative position between the sensor element 30 and the magnet 20 when no field directing device is provided (waveform 60), the triangular field directing device 32 is provided (waveform 62) and the field directing device 42 is provided (measurement of the horizontal field: waveform 64; measurement of the vertical field perpendicular to the direction 28: waveform 66). In the case of the measurement of the waveform 64, the field directing device is arranged in the way shown in FIG. 6, that is to say the end 48 of the field directing device 42 is aligned substantially parallel to the zero-position direction 58, while in the case of the horizontal position this alignment is perpendicular. It must be taken into account that the sensor element was at a greater distance from the magnet 28 in the case of the measurement of the waveform 66 than in the case of the measurement of the horizontal field (waveform 64).

As can be seen from FIG. 8, the measuring signal can be increased by means of the geometrical configuration of the field directing device if the latter is suitably positioned in relation to the magnet 20, consequently allowing the signal to be further evaluated. In particular, the geometrical shape and, in particular, a delimiting line defining the height, can consequently be chosen such that the output signal is substantially linear, at least in a specific range. In this respect, the curves 62 and 64 are to be compared with each other.

Consequently, the appropriate geometrical configuration of the field directing device allows an output signal which contains analog distance-related information, at least for a specific relative positional range, to be tapped from the sensor assembly 22.

Corresponding distance-related information can be used to generate further functions with the aid of the sensor assembly 22. For example, this distance-related information in the analog output signal may be used for moving specifically to one or more positions of the piston 12 and, in particular, to slow down the moving parts before a stop position ("soft stop"). For example, this also allows an end position to be monitored for displacement from this end position.

A sensor assembly may also be provided with a number of field directing devices, which are arranged for example opposite one another at a distance from each other and are formed in the same way. It is also possible, however, to provide field directing devices of different geometrical shapes in order to optimize the exposure of the sensor element 30 to a field.

The direction in which the transverse height Q of the field directing device increases is in this case toward the sensor element 30 and, if the field directing device lies between the sensor element 30 and the magnet 20, away from the magnet 20 (compare FIGS. 5 and 6).

The invention claimed is:

1. A sensor assembly for detecting the position of a magnet which is arranged in a cylinder housing and is movable in relation to the sensor assembly, comprising:
   a sensor housing; and
   a sensor element sensitive to magnetic fields, said sensor element being arranged in the sensor housing, wherein a digital output signal is generatable, a switching state of which is dependent on a relative position between the sensor element and the magnet in said cylinder housing;
   at least one field directing device of a magnetizable material which is fixedly arranged in said sensor housing with respect to the sensor element, said field directing device varying in its geometrical dimensions transversely in relation to a direction of relative movement between the magnet and the sensor element, in such a way that an intensified analog sensor signal which characterizes the relative position between the sensor element and the magnet is generatable, at least in a specific relative positional range; wherein:
   the sensor housing with said sensor element and said field directing device is positionable as a unit outside said cylinder housing for sensing the relative position of the movable magnet in said cylinder housing;
   a position of the unit on the outside of the cylinder housing is changeable:
   the field directing device is of flat shape;
   a transverse height of the field directing device is less transversely in relation to the direction of relative movement at an end remote from the sensor element than at an end toward the sensor element; and
   the transverse height of the field directing device monotonically varies between said ends, at least in a subregion.

2. The sensor assembly as claimed in claim 1, wherein the field directing device varies in its length along the direction of relative movement.

3. The sensor assembly as claimed in claim 1, wherein the field directing device is manufactured from a material with a high saturation field strength and steep hysteresis.

4. The sensor assembly as claimed in claim 1, wherein the field directing device is manufactured from Mu-metal.

5. The sensor assembly as claimed in claim 1, wherein the field directing device is a one-piece device.

6. The sensor assembly as claimed in claim 1, wherein a transverse height of the field directing device decreases, at least in a subregion, with respect to a direction away from the sensor element toward the magnet, if the field directing device is between the sensor element and the magnet.

7. The sensor assembly as claimed in claim 1, wherein the field directing device is adapted in such a way that a substantially linear analog output signal is obtained, at least in a specific relative positional range.

8. The sensor assembly as claimed in claim 1, wherein a transverse height of the field directing device increases substantially linearly toward the sensor element.

9. The sensor assembly as claimed in claim 8, wherein the field directing device is of a triangular form.

10. The sensor assembly as claimed in claim 1, wherein a transverse height of the field directing device decreases in the region of its end toward the sensor element-to a greater degree, away from said end, than in the region of its end remote from the sensor element, toward said end.

11. The sensor assembly as claimed in claim 1, wherein the field directing device is arranged in such a way that it is oriented in a longitudinal direction substantially parallel with respect to the direction of relative movement between the sensor element and the magnet.

12. The sensor assembly as claimed in claim 11, wherein the longitudinal direction of the field directing device is determined by its longer side.

13. The sensor assembly as claimed in claim 1, wherein the field directing device is arranged in such a way that it does not cover the sensor element.

14. The sensor assembly as claimed in claim 1, wherein the field directing device is arranged in the sensor housing.

15. The sensor assembly as claimed in claim 1, wherein there is at least one further sensor element, which, for carrying out measurements at remote spatial locations at a distance, is arranged at a distance from the other sensor element.

16. The sensor assembly as claimed in claim 1, wherein the analog output signal is tapable.

17. The sensor assembly as claimed in claim 1, wherein, for fixing on a functional unit, a sensor holder is provided, which may be brought into a position following the sensor housing in the longitudinal direction and, in this position, is releasably connectable to the sensor housing by means of positively engaging elements.

18. A functional unit comprising:
   a first housing;
   a part which is movable in the first housing and a position of which is to be detected, the movable part being connected to a magnet; and
   a sensor assembly positionable outside of the first housing in order to sense the position of the movable part without contact,
   said sensor assembly comprising:
   a sensor housing;
   a sensor element sensitive to magnetic fields, said sensor element being arranged in the sensor housing, wherein a digital output signal is generatable, a switching state of which is dependent on a relative position between the sensor element and the magnet;
   at least one field directing device of a magnetizable material which is fixedly arranged in the sensor housing with respect to the sensor element, said field directing device varying in its geometrical dimensions transversely in relation to a direction of relative movement between the magnet and the sensor element, in such a way that an intensified analog sensor signal which characterizes the relative position between ihe sensor element and the magnet is generatable, at least in a specific relative positional range, without contact between the sensor element and the magnet; wherein:
   the field directing device is of flat shape;
   a position of the sensor assembly on the outside of the first housing is changeable;

a transverse height of the field directing device is less transversely in relation to the direction of relative movement at an end remote from the sensor element than at an end toward the sensor element; and the transverse height of the field directing device monotonically varies between said ends, at least in a subregion.

19. The functional unit as claimed in claim 18, wherein the sensor assembly provides a digital position signal when the movable part reaches a specific relative position with respect to the sensor element.

20. The functional unit as claimed in claim 18, wherein the sensor assembly provides an analog position signal at least in a specific relative positional range.

21. The functional unit as claimed in claim 20, wherein the analog position signal is used to approach one or more positions.

22. The functional unit as claimed in claim 20, wherein the analog position signal is used to slow down or brake the movable part.

23. The functional unit as claimed in claim 20, wherein the analog position signal is used to monitor a specific position of the movable part.

24. The functional unit as claimed in claim 18, wherein the magnet has an axial magnetization.

25. The functional unit as claimed in claim 24, wherein the field directing device is arranged with a longitudinal side aligned with the direction of magnetization.

26. The functional unit as claimed in claim 20, wherein the analog position signal is used for controlling the movement of the movable part.

* * * * *